(12) United States Patent
Ogawara et al.

(10) Patent No.: US 8,967,310 B2
(45) Date of Patent: Mar. 3, 2015

(54) HAULAGE VEHICLE

(75) Inventors: Hiroaki Ogawara, Chikusei (JP); Shinji Akino, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/823,456

(22) PCT Filed: Oct. 26, 2011

(86) PCT No.: PCT/JP2011/005975
§ 371 (c)(1),
(2), (4) Date: Mar. 14, 2013

(87) PCT Pub. No.: WO2012/056690
PCT Pub. Date: May 3, 2012

(65) Prior Publication Data
US 2013/0199862 A1 Aug. 8, 2013

(30) Foreign Application Priority Data
Oct. 28, 2010 (JP) .................. 2010-242610

(51) Int. Cl.
*B60K 11/04* (2006.01)
*B60R 13/08* (2006.01)
*B60R 19/52* (2006.01)
(Continued)

(52) U.S. Cl.
CPC .............. *B60K 11/02* (2013.01); *B60R 19/52* (2013.01); *B60K 11/08* (2013.01); *B60K 11/04* (2013.01); *B60R 2019/525* (2013.01); *B60Y 2200/41* (2013.01); *B60Y 2200/145* (2013.01); *B60Y 2306/09* (2013.01)

USPC ..... 180/68.1; 180/68.4; 180/68.6; 180/69.24; 181/224; 181/198

(58) Field of Classification Search
CPC B60R 13/08; B60R 13/0838; B60R 13/0884; B60R 19/52; B60R 19/04; B60R 2019/525; B60K 11/00–11/08; B62D 25/08; B62D 25/082; F02B 77/13; F01P 11/12; F24F 13/24; F24F 2013/242; F02M 35/12; F02M 35/1205; F02M 35/1211; F02M 35/1216; F02M 35/1272; F02M 35/1277; F02M 35/16; F02M 35/164; F02M 35/161; B60P 1/00; B60Y 2200/41; B60Y 2200/145; B60Y 2306/09
USPC ............ 180/68.1, 68.6, 69.24; 181/204, 214, 181/222, 205, 198, 200, 224
See application file for complete search history.

(56) References Cited

U.S. PATENT DOCUMENTS 2,013,384 A * 9/1935 Green ............................ 52/581
2,796,141 A * 6/1957 Schreiner ..................... 180/68.6
3,762,489 A * 10/1973 Proksch et al. ............... 180/68.1
(Continued)

FOREIGN PATENT DOCUMENTS

JP 63-247119 A 10/1988
JP 4-13264 Y2 3/1992
(Continued)

*Primary Examiner* — J. Allen Shriver, II
*Assistant Examiner* — Steven Clemmons
(74) *Attorney, Agent, or Firm* — Mattingly & Malur, PC

(57) ABSTRACT

An opening through which air is delivered to a radiator for an engine installed in a haulage vehicle is split into separate portions via a support frame. Sound absorbing ducts are each mounted over one of the partitioned opening areas formed by splitting the opening via the support frame.

4 Claims, 11 Drawing Sheets

(51) Int. Cl.
*B60K 11/02* (2006.01)
*B60K 11/08* (2006.01)

(56) References Cited

U.S. PATENT DOCUMENTS

| | | | |
|---|---|---|---|
| 3,815,965 A * | 6/1974 | Ostwald | 312/100 |
| 3,897,850 A * | 8/1975 | Thompson et al. | 181/204 |
| 4,121,683 A * | 10/1978 | Kohriyama | 180/68.6 |
| 4,169,501 A * | 10/1979 | Takeuchi et al. | 165/126 |
| 4,334,588 A * | 6/1982 | Tezuka et al. | 180/68.6 |
| 4,403,648 A * | 9/1983 | Styok | 165/76 |
| 4,406,489 A * | 9/1983 | Trabert | 293/115 |
| 6,167,976 B1 * | 1/2001 | O'Neill et al. | 180/69.2 |
| 6,405,825 B1 * | 6/2002 | Yabe et al. | 181/204 |
| 6,435,264 B1 * | 8/2002 | Konno et al. | 165/41 |
| 6,688,424 B1 * | 2/2004 | Nakada et al. | 181/224 |
| 6,719,078 B2 * | 4/2004 | Nakamura | 180/69.22 |
| 7,370,718 B2 * | 5/2008 | Witwer et al. | 180/69.2 |
| 7,581,607 B2 * | 9/2009 | Moen et al. | 180/68.6 |
| 2002/0153181 A1 * | 10/2002 | Nakamura | 180/68.1 |
| 2003/0066209 A1 | 4/2003 | Takezaki et al. | |
| 2005/0093309 A1 * | 5/2005 | Lloyd | 293/115 |
| 2008/0157566 A1 * | 7/2008 | Tazaki et al. | 296/193.1 |
| 2009/0066096 A1 * | 3/2009 | Doroghazi et al. | 293/115 |

FOREIGN PATENT DOCUMENTS

| | | |
|---|---|---|
| JP | 2575307 B2 | 10/1996 |
| JP | 2001-107741 A | 4/2001 |
| JP | 2002-332659 A | 11/2002 |
| JP | 2003-113715 A | 4/2003 |
| JP | 2003-129847 A | 5/2003 |
| JP | 2005-126902 A | 5/2005 |
| JP | 2009-083803 A | 4/2009 |

* cited by examiner

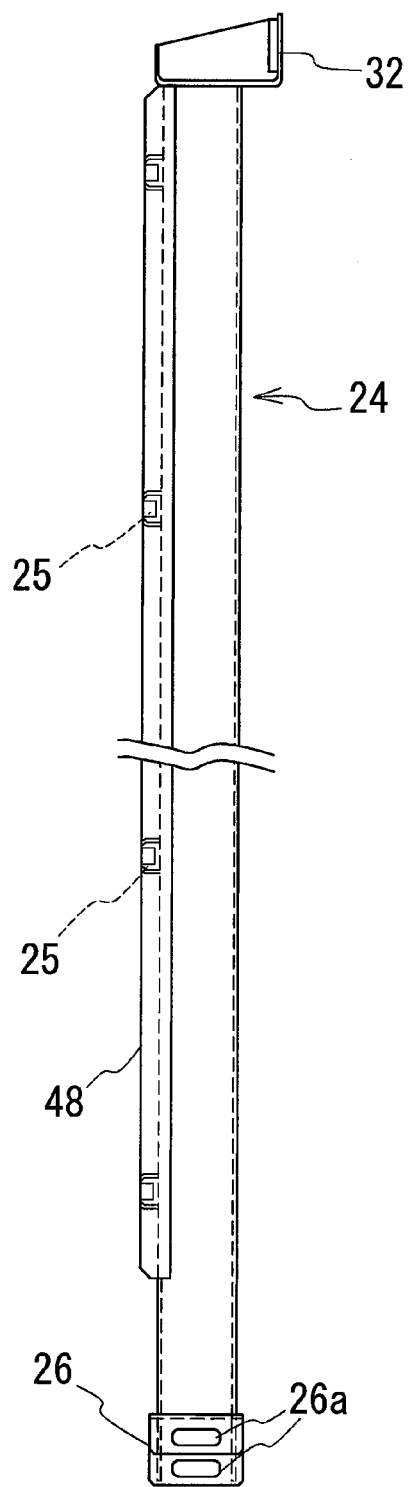

HAULAGE VEHICLE

TECHNICAL FIELD

The present invention relates to a haulage vehicle such as a dump truck, and more specifically it relates to a sound absorbing duct device that will be ideal in applications in conjunction with large dump trucks.

BACKGROUND ART

As described in Japanese Patent Gazette No. 2575307, a dump truck is typically equipped with a radiator mounted on the front side of the chassis with a radiator guard installed at the front of the radiator so as to protect the radiator. Such a radiator guard is constituted with a single-peace integrated cover. Japanese Laid Open Patent Publication No. 2003-129847 discloses a cover having a radiator fan sound absorbing function, which is achieved by forming the cover as a noise-suppression duct.

SUMMARY OF THE INVENTION

Technical Problem

When a dump truck such as that disclosed in Japanese Patent Gazette No. 2575307, which includes a cover, constituted with a noise-suppression duct formed by bonding a sound absorbing material on the inner walls of a plurality of passages forming a lattice pattern, as disclosed in Japanese Laid Open Patent Publication No. 2003-129847, installed at the front of the radiator in order to protect the radiator, needs to be disassembled and reassembled for maintenance and inspection or for shipping, the noise-suppression duct must be disengaged and then reattached. In a large dump truck with a large engine capacity, cooling air must be taken in through an air intake port with a large opening area. In such a case, the weight of the noise-suppression duct may be as much as several hundred kilograms, making it cumbersome and thus making the process of attaching and detaching it difficult. There is an added problem in that such a large noise-suppression duct will require significant storage space.

An object of the present invention, having been completed by addressing the issues discussed above, is to provide a haulage vehicle achieving a duct device mounting structure that facilitates the process of mounting and dismounting a sound absorbing duct at/from the chassis, improves the ease of operation and assures better storage convenience for a disengaged sound absorbing duct.

Solution to Problem

The haulage vehicle according to the present invention includes a support frame that divides an opening area, through which air is taken into a radiator for an engine installed in the chassis of the haulage vehicle, into smaller partitioned areas and a plurality of sound absorbing ducts, each mounted at one of the partitioned areas constituting part of the opening area defined by the support frame, by locking mounting pieces disposed in peripheral areas to a frame present around the opening area and to the support frame via bolts, and each having a plurality of air passages with a sound absorbing material bonded to inner walls of the air passages.

The haulage vehicle according to the present invention is further characterized in that a lower end of the support frame is locked to a mainframe of the chassis, whereas an upper end of the support frame is locked to a foot access deck so as to divide the opening area into two partitioned areas, i.e., a left portion and a right portion.

The haulage vehicle according to the present invention is further characterized in that the support frame includes air passages through which air travels to the radiator.

The haulage vehicle according to the present invention, with the support frame having an air passage through which air travels to the radiator, is further characterized in that a sound absorbing material is bonded to the inner walls of the air passages.

Advantageous Effects of the Invention

According to the present invention, the sound absorbing duct is provided as a sound absorbing duct unit comprising a plurality of separate sound absorbing ducts, with each sound absorbing duct weighing only approximately half or less the weight of a single-piece sound absorbing duct mounted at the opening area, and having a bulk half or less that of the single-piece sound absorbing duct. Such sound absorbing ducts can be handled with better ease, which is bound to lead to improved operability. As a result, the sound absorbing ducts can each be mounted at the chassis and disengaged from the chassis with better ease. In addition, since the sound absorbing ducts each take up a smaller area, disengaged sound absorbing ducts can be stored by stacking them one on top of the other so as to save storage space and thus, better storage convenience is assured. Furthermore, since the sound absorbing ducts are locked at their peripheral areas via bolts to the support frame as well as to the frame present around the opening area, an improvement in mounting strength is achieved.

According to the present invention, the opening area is split into two partitioned areas, i.e., the left portion and the right portion, and thus, a passage leading to the radiator, through which a worker can access the radiator, can be created by disengaging the sound absorbing duct present on either side. This means that radiator maintenance/inspection can be performed without having to open up the entire area by disengaging both sound absorbing ducts. As a result, radiator maintenance/inspection work can be made significantly easier.

Moreover, the structure according to the present invention may include an air passage formed at the support frame, through which air is allowed to travel toward the radiator, so as to ensure that the sound absorbing ducts can be mounted at the opening area without the presence of the support frame resulting in any decrease in the amount of air traveling to the radiator.

In addition, according to the present invention, a sound absorbing material may be installed in the air passage formed at the support frame so as to achieve a noise dampening effect at the support frame.

BRIEF DESCRIPTION OF THE DRAWINGS

FIG. 4B is a side elevation of the support frame achieved in the embodiment.

DESCRIPTION OF EMBODIMENTS

Figure 1:
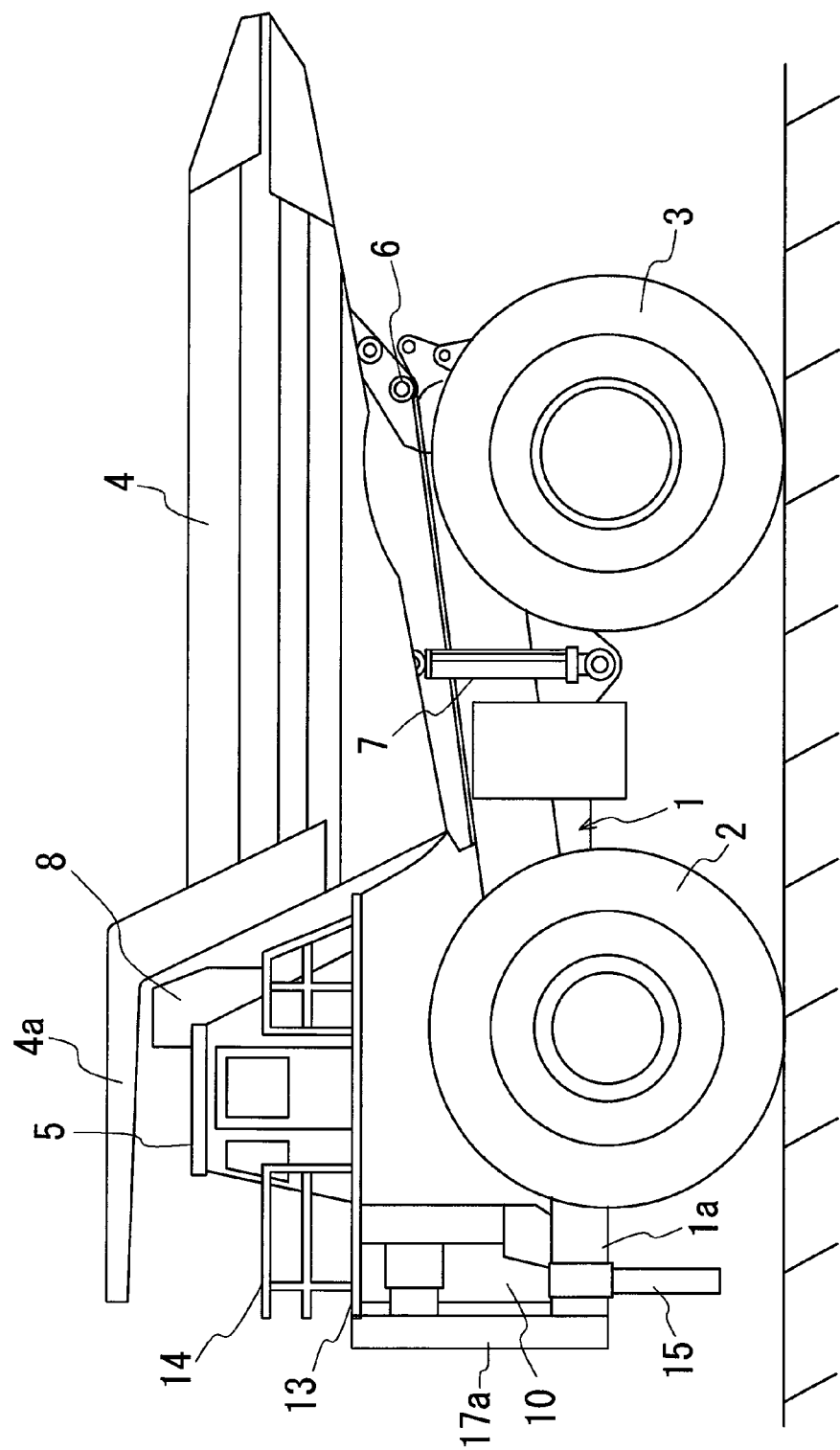
FIG. 1 is a side elevation of a haulage vehicle achieved in an embodiment of the present invention.
Figure 2:
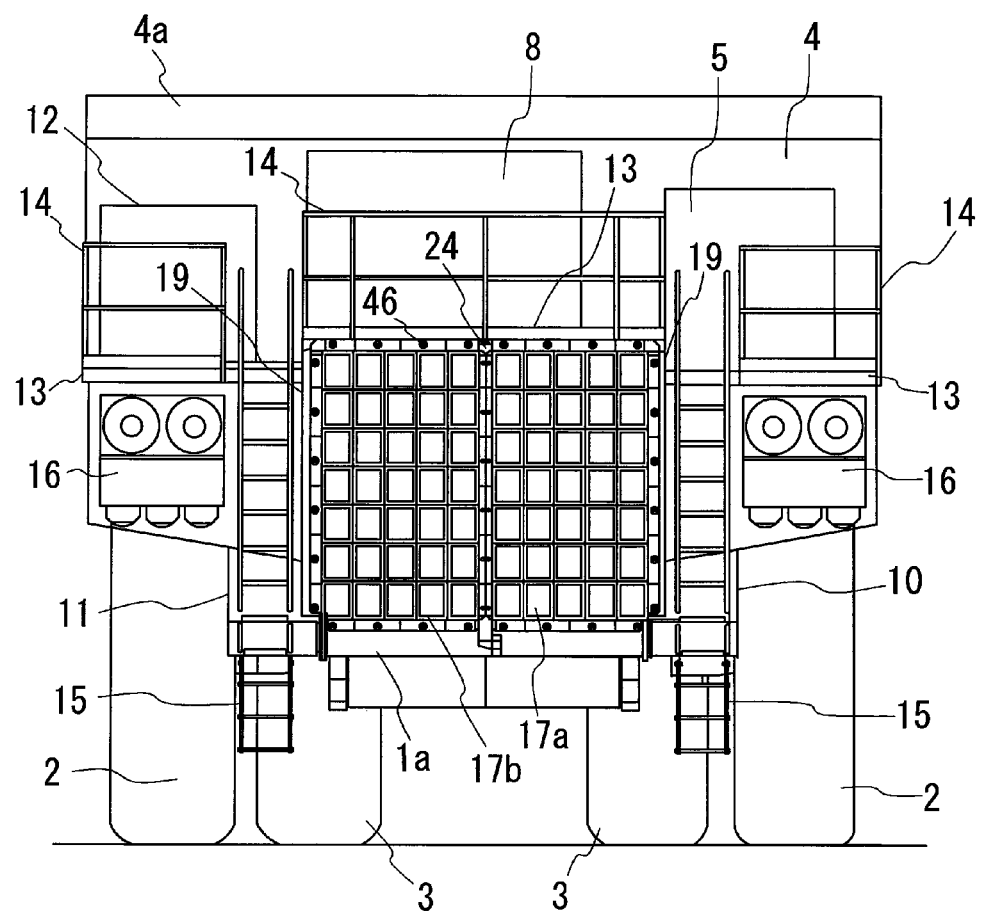
FIG. 2 is a front view showing the front side of the haulage vehicle in FIG. 1.

FIG. 1 is a side elevation showing the haulage vehicle achieved in an embodiment of the present invention, whereas FIG. 2 is a front view showing the front side of the haulage vehicle. The haulage vehicle achieved in this embodiment is a dump truck comprising a chassis 1 having a sturdy frame structure with front wheels 2 and rear wheels 3 mounted thereat, a vessel 4 that functions as a load carrying platform and a cabin 5. The vessel 4 and the cabin 5 are mounted on the chassis 1. The vessel 4 is a large container capable of holding a huge volume of heavy cargo, such as crushed rock or coal, the full length of which ranges over 10 to 13 m. A hood 4a, which shields the upper side of the cabin 5, is disposed at an upper area on the front side of the vessel 4 as an integrated part of the vessel 4. The vessel 4 can be hoisted up/down via a hydraulic cylinder 7, with the hoisting motion centered on a shaft 6 located on the rear side of the chassis 1.

An engine that works as a prime drive motor and a generator and a hydraulic pump both of which are driven by the engine, are all mounted (none shown) on the chassis 1 on the bottom side of the cabin 5. In addition, a radiator 20 (see FIG. 3) is installed to the front relative to the engine and the like. It is to be noted that other heat exchangers, such as an air-conditioning heat exchanger, a hydraulic fluid heat exchanger and a fuel heat exchanger, may also be installed in the area where the radiator is installed. Reference numeral 8 indicates a control panel that functions as a power control device for executing power control in the dump truck. Via the control panel 8, an electric motor for driving the rear wheels 3 and the like are engaged in operation with power generated at the generator.

As shown in FIG. 2, longitudinal frames 10 and 11 are securely attached to the left side and the right side on a mainframe 1a of the chassis 1, with the cabin 5 disposed above the left-side longitudinal frame 10. In addition, the control panel 8 is installed to the right of the cabin 5 at the main frame 1a. A resistor 12 that utilizes the back electromotive force generated through electric braking is installed on the right-side longitudinal frame 11. Reference numeral 13 indicates a deck disposed so as to range above the longitudinal frames 10 and 11 and between the longitudinal frames 10 and 11, providing foot access for an operator, a maintenance worker and the like, whereas reference numeral 14 indicates handrails ranging upright along the perimeter of the deck. The deck 13 and the handrails 14 are mounted so as to range around the cabin 5, around the front side of the control panel 8 and the like, and are supported by the left-side and right-side longitudinal frames 10 and 11. Reference numeral 15 indicates a ladder disposed at each of the longitudinal frames 10 and 11, through which the operator or the maintenance worker is able to climb onto the deck 13, and reference numeral 16 indicates an air cleaner for removing dust in the air to be taken into the engine. Reference numerals 17a and 17b indicate sound absorbing ducts according to the present invention, which are disposed on the left side and on the right side of the support frame 24 as ducts independent of each other.

Figure 3:
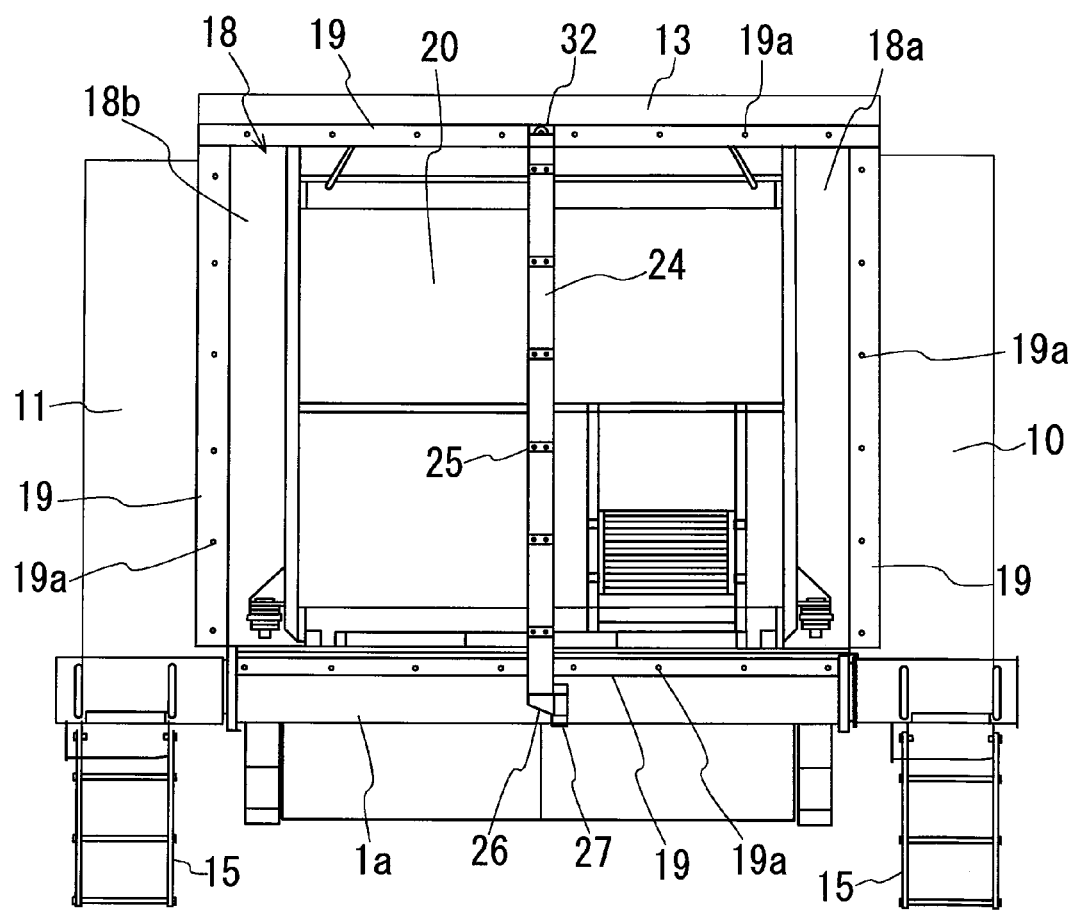
FIG. 3 provides a front view of the sound absorbing duct mounting area with the sound absorbing ducts disengaged, in the haulage vehicle shown in FIG. 2.

FIG. 3 shows the mounting area where the sound absorbing ducts 17a and 17b is to be mounted, in a state in which the sound absorbing ducts 17a and 17b are disengaged. As shown in FIG. 3, an opening area 18 through which air is taken into the radiator 20 is split into two partitioned areas 18a and 18b by a support frame 24. In the peripheral area surrounding the opening area 18, fastening panels 19 for mounting the sound absorbing ducts 17a and 17b, are welded to the main frame 1a, the longitudinal frames 10 and 11 and the deck 13. Screw holes 19a, via which the sound absorbing ducts 17a and 17b are mounted, are formed in the fastening panels 19.

Figure 4A:
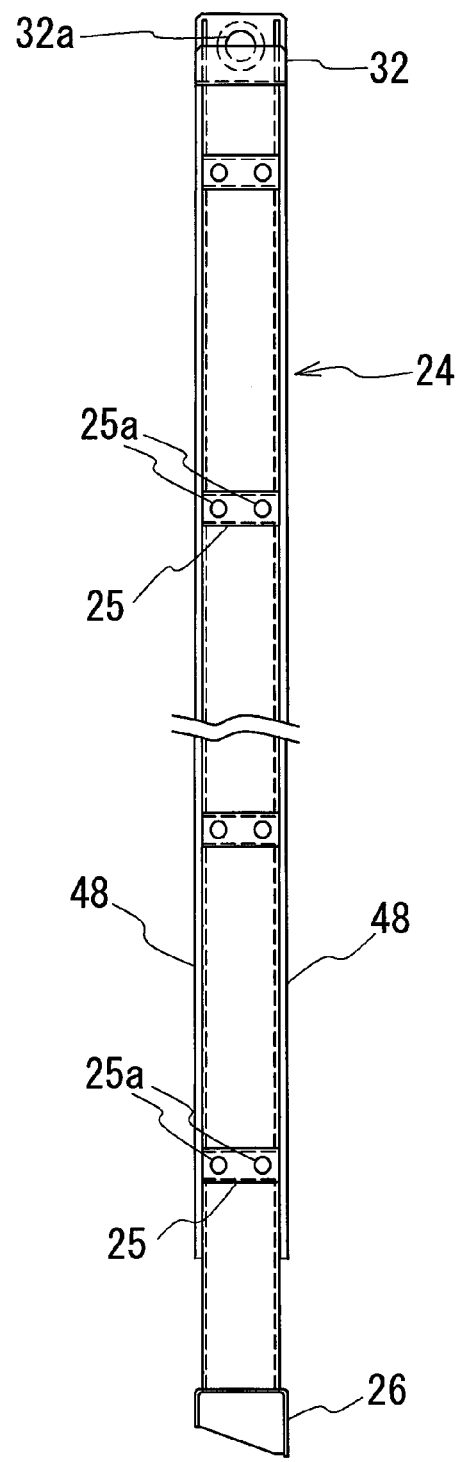
FIG. 4A is a front view of the support frame achieved in the embodiment.

FIGS. 4A and 4B respectively provide a front view and a side elevation of the support frame 24. A plurality of fastening panels 25, to be used to lock each of the sound absorbing ducts 17a and 17b on one side thereof, are welded over intervals along the top/bottom direction to the front face of the support frame 24, a lateral section of which assumes a rectangular shape. The fastening panels 25 each include screw holes 25a, one located on the left side and the other located on the right side. A mounting plate 26, via which the support frame 24 is to be attached to the main frame 1a, is welded to the lower end of the support frame 24. In addition, a mounting plate 32, via which the support frame 24 is to be attached to the deck 13, is welded to the upper end of the support frame 24. Reference numeral 48 indicates an air entry preventing plate welded to each of the two sides, i.e., the left side and the right side, of the support frame 24. The air entry preventing plates 48, disposed so as to project out by an extent equal to the projecting range over which of the fastening panels 25 at the support frame 24 project out, prevent entry of air into the opening area 18 through the gaps between fastening panels 25 and 25 disposed in succession along the top/bottom direction when the sound absorbing ducts 17a and 17b are locked by placing mounting pieces 45 (see FIG. 7) in contact.

Figure 5:
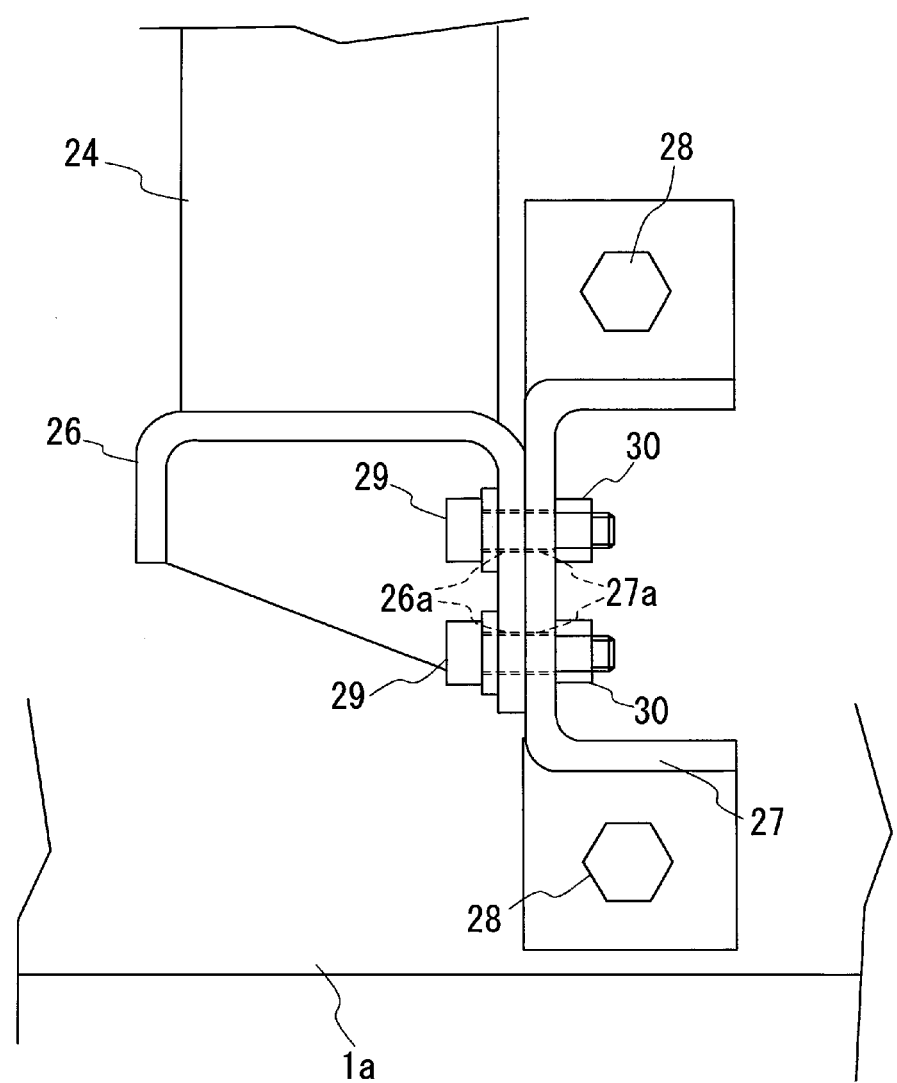
FIG. 5 is a front view showing the mounting structure adopted in the embodiment for mounting the support frame at the mainframe.

FIG. 5 shows the mounting structure adopted for attaching the lower end of the support frame 24 to the main frame 1a. As FIG. 5 shows, a bracket 27 that projects forward is locked to the front face of the main frame 1a with bolts 28, and bolts 29 are inserted through bolt insertion holes 26a and bolt insertion holes 27a respectively formed at the mounting plate 26 welded to the support frame 24 and the bracket 27. Then, nuts 30 are threaded onto the bolts 29 at the rear surface of the bracket 27 and tightened to lock the lower end of the support frame 24 to the main frame 1a. It is to be noted that the bolt insertion holes 26a at the mounting plate 26 are formed as elongated holes elongated along the forward/backward direction, as shown in FIG. 4B so that the position of the support frame 24 can be adjusted along the forward/backward direction.

Figure 6:
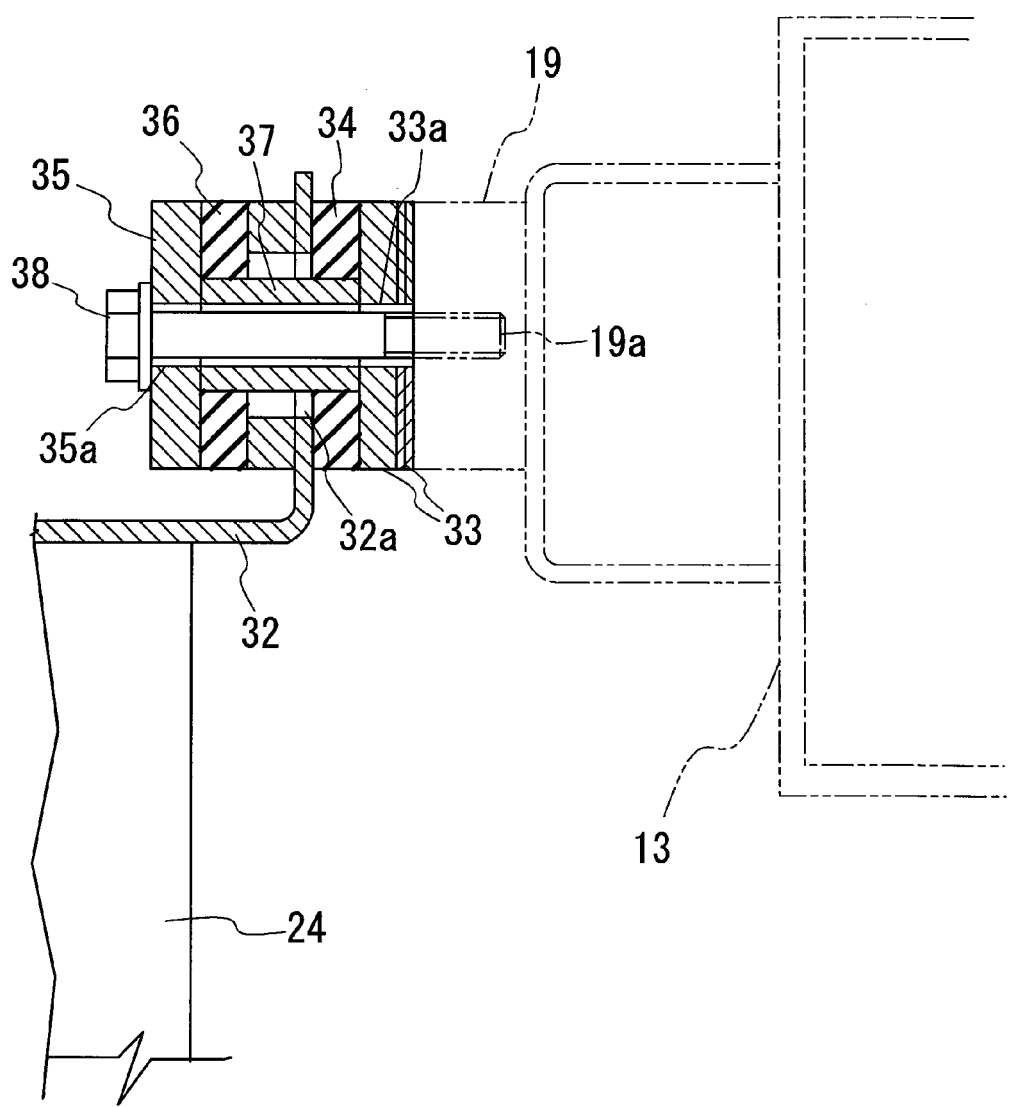
FIG. 6 is a side elevation showing in a sectional view the mounting structure adopted in the embodiment for mounting the support frame at the deck.

FIG. 6 shows the mounting structure adopted for attaching the upper end of the support frame 24 to the deck 13. As shown in FIG. 6, a shim 33 and a rubber vibration isolator are held between the fastening panel 19 disposed at the deck 13 and the mounting plate 32, with a rubber vibration isolator 36 inserted between the mounting plate 32 and a retaining plate 35. In addition, a tubular spacer 37 is fitted through holes formed in the rubber vibration isolators 34 and 36 and a hole formed at the mounting plate 32. The upper end of the support frame 24 is securely locked to the deck 13 by inserting a bolt 38 through a bolt insertion hole 35a formed at the retaining plate 35 and a bolt insertion hole 33a ranging from the spacer 37 through the shim 33 and then tightening the bolts 38 by threading them into screw holes 19a formed at the fastening panels 19. The shim 33 is disposed so as to enable adjustment of the extent to which the support frame 24 is allowed to project out forward. In addition, the presence of the rubber vibration isolators 34 and 36 reduces the force to which the support frame 24 is subjected due to vibration of the deck 13, which vibrates at a vibration rate and amplitude different from those of the main frame 1a (the deck 13 vibrates more readily than the main frame 1a) while the dump truck is engaged in operation.

Figure 7:
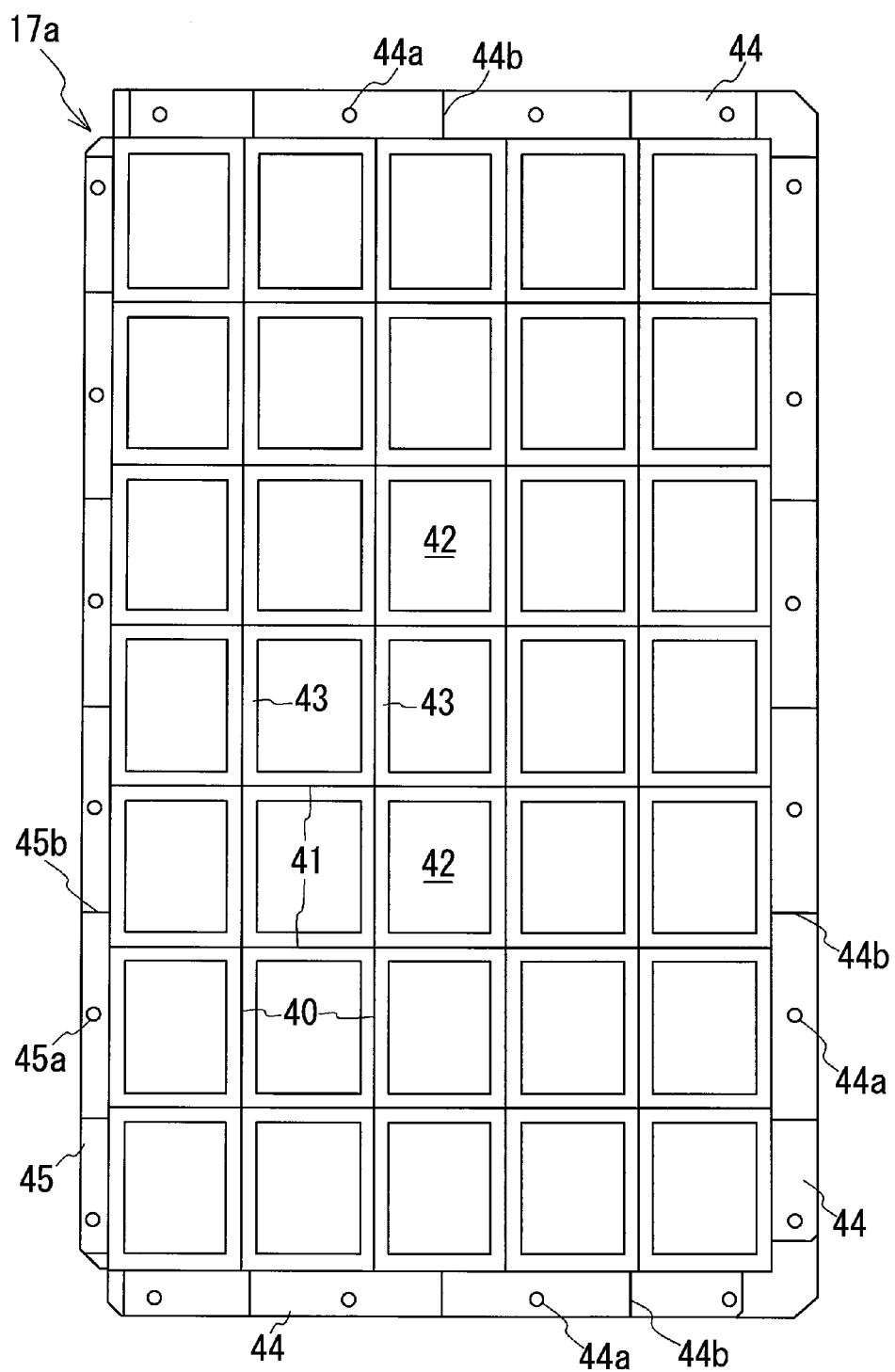
FIG. 7 is a front view showing the structure of a sound absorbing duct achieved in the embodiment.

The structure of the sound absorbing ducts 17a and 17b will be explained next in reference to FIG. 7, showing one of the sound absorbing ducts, i.e., the sound absorbing duct 17a, taken as a typical example. As shown in FIG. 7, the sound absorbing ducts 17a is formed by forming a plurality of air passages 42 defined with a lattice pattern by longitudinal and lateral metal plates 40 and 41 firmly fixed to each other and by bonding a sound absorbing material 43 constituted of, for instance, urethane resin foam, to the inner walls of the metal plates 40 and 41 defining the individual air passages 42. Mounting pieces 44, to be used for attaching the sound absorbing duct 17a to the fastening panels 19 around the opening area 18, are disposed on three sides at the periphery of the sound absorbing duct 17a. In addition, a mounting piece 45, to be used for attaching the sound absorbing duct 17a to the fastening panels 25 at the support frame 24 is disposed on the remaining side at the periphery of the sound absorbing duct 17a. Bolt insertion holes 44a and 45a are formed in these mounting pieces 44 and 45. Reference numerals 44b and 45b each indicate a rib welded between the plate surface of the mounting piece 44 or 45 and the outer surface of the sound absorbing duct 17a. The other sound absorbing duct 17b is configured so as to achieve symmetry with the sound absorbing duct 17a.

Figure 8:
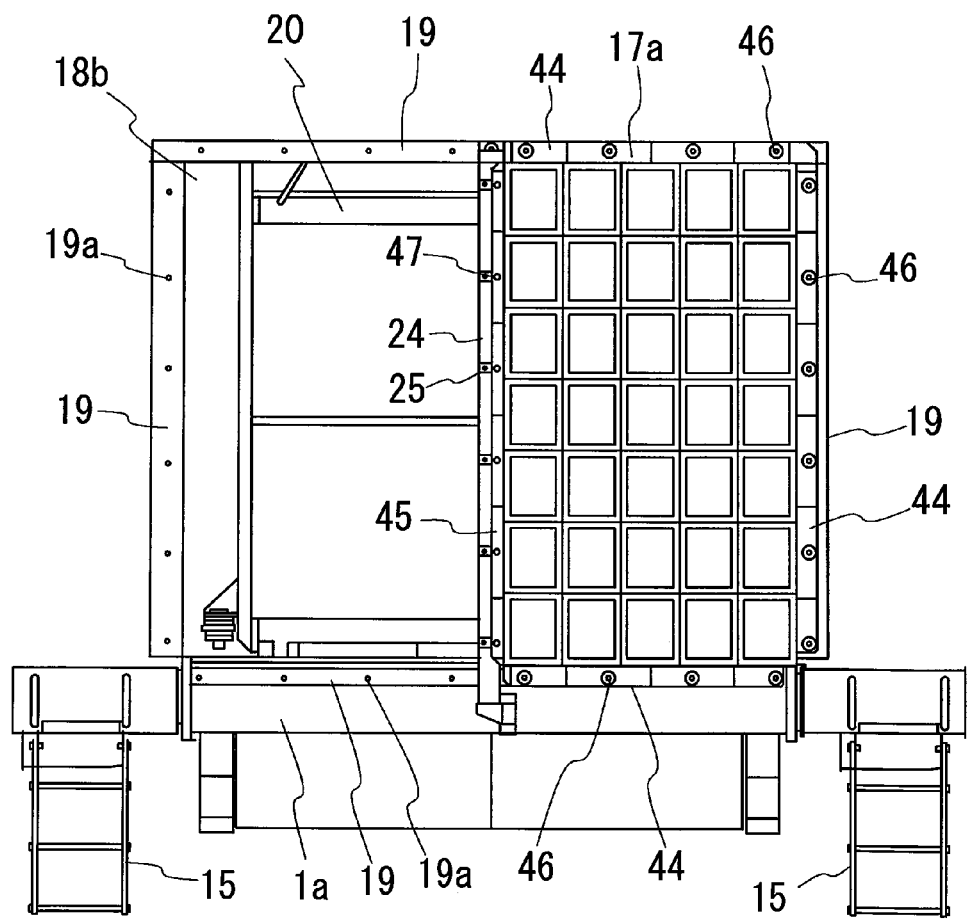
FIG. 8 provides a front view of the sound absorbing duct mounting area in the embodiment, with one of the sound absorbing duct disengaged from the sound absorbing duct mounting area.

As shown in FIG. 8, the sound absorbing duct 17a is locked by placing the three sides thereof against the fastening panels 19 welded to the main frame 1a, the longitudinal frame 10 and the deck 13, inserting bolts 46 through the bolt insertion holes 44a at the mounting pieces 44 and then threading the bolts 46 through the screw holes 19a. The mounting piece 45 at the sound absorbing duct 17a is locked by threading bolts 47, inserted through the bolt insertion holes 45a, through screw holes 25a at the fastening panels 25 and then fastening the bolts 47 at the screw holes 25a.

Figure 9:
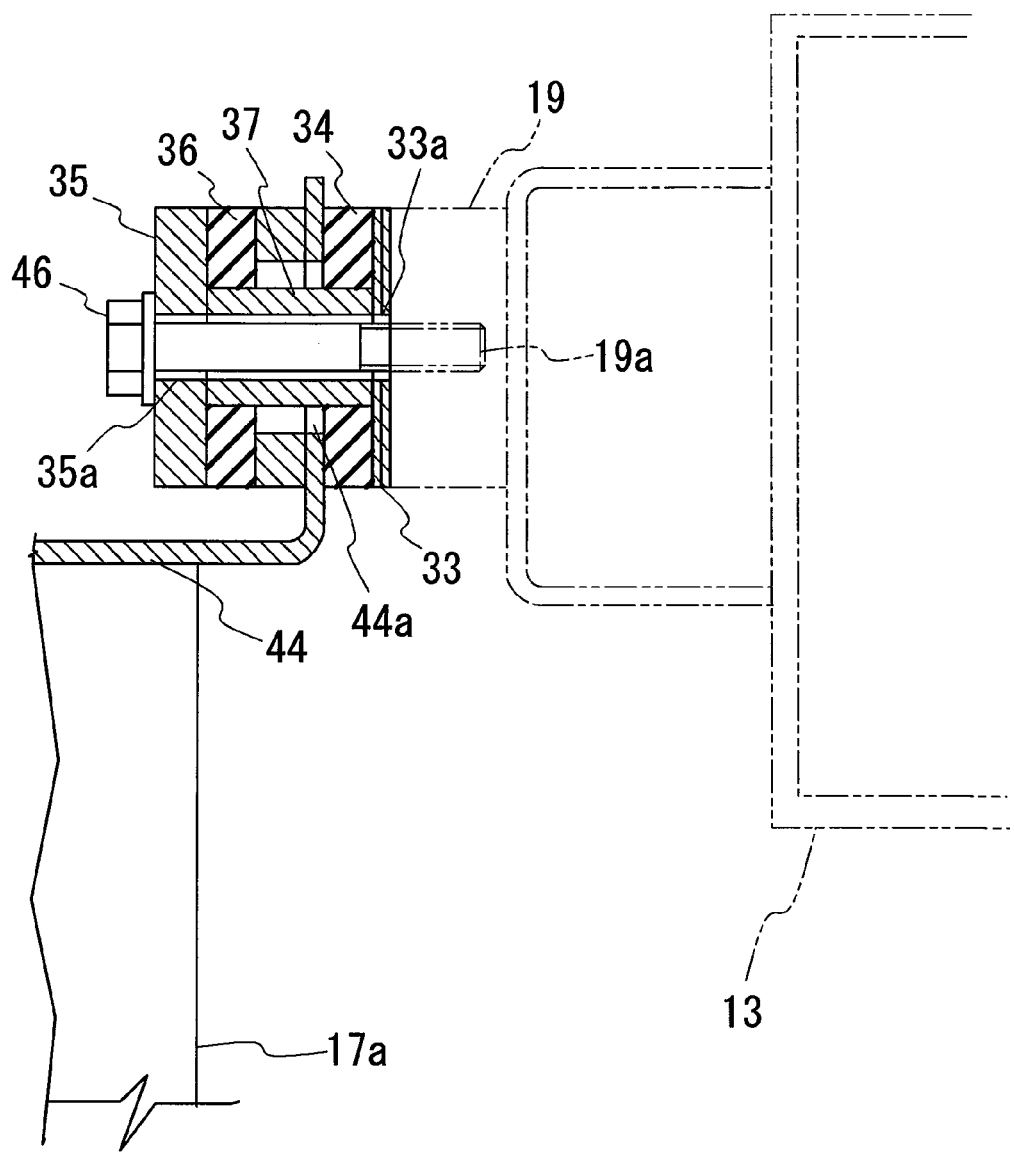
FIG. 9 is a side elevation showing, in a sectional view, the mounting structure adopted in the embodiment for mounting the sound absorbing ducts at the deck.

FIG. 9 shows the structure adopted when locking the mounting piece 44 to the deck 13 via the bolts 46. This locking structure is achieved in conjunction with the bolts 46 by using rubber vibration isolators 34 and 36 and a shim 33, in much the same way as that with which the mounting plate 32 located at the upper end of the support frame 24 is attached to the deck 13, as has been described in reference to FIG. 6. The other mounting pieces 44 are also attached to the fastening panels 19 disposed at the main frame 1a and the longitudinal frames 10 and 11 located on the left side and on the right side by adopting similar mounting structures. The other sound absorbing duct 17b, too, is mounted at the opening area 18 in a similar manner.

As described above, the duct device achieved in the embodiment includes a sound absorbing duct unit configured with a split structure that includes a plurality of sound absorbing ducts 17a and 17b. The weight and the dimensions of each of such sound absorbing ducts will be substantially half those of a single-piece sound absorbing duct mounted at the opening area 18. In more specific terms, the weight of each of the two sound absorbing ducts 17a and 17b installed in a 140-ton dump truck will be approximately 200 kg. Such sound absorbing ducts, each weighing significantly less and taking up an area substantially half that taken up by a single-piece sound absorbing duct, can be handled with better ease, which ultimately assures better operability and facilitates mounting and dismounting of the sound absorbing ducts at/from the chassis.

In addition, since the sound absorbing ducts 17a and 17b each take up a smaller area, disengaged sound absorbing ducts can be stored by stacking them one on top of the other so as to save storage space and thus, better storage convenience is assured. Furthermore, since the sound absorbing ducts 17a and 17b are locked via bolts 47 at their peripheral areas to the support frame 24 as well as to the frame members present around the opening area 18, an improvement in mounting strength is achieved. The mounting pieces 44 are attached to the fastening panels 19 disposed at the main frame 1a, the left-side longitudinal frame 10 and the right-side longitudinal frame 11 in much the same way as has been described earlier.

In addition, the opening area 18 in the embodiment is split into two partitioned areas via the support frame 24, i.e., the left portion and the right portion, a passage leading to the radiator, through which a worker can access the radiator 20, can be created simply by disengaging the sound absorbing duct present on either side, e.g., the sound absorbing duct 17b, as shown in FIG. 8. For instance, the partitioned areas 18a and 18b formed by splitting the opening area 18 in a 14-ton dump truck, each assure a clearance of at least 1 m along the left/right direction, i.e., along the widthwise direction and at least 2 m along the heightwise direction. Furthermore, a space through which maintenance personnel will be able to pass is formed between the sound absorbing ducts 17a and 17b and the radiator 20. This means that maintenance•inspection of the radiator 20 can be performed simply by disengaging one of the sound absorbing ducts 17a or 17b instead of having to disengage both sound absorbing ducts 17a and 17b, thereby significantly improving the ease of maintenance•inspection.

Figure 10:
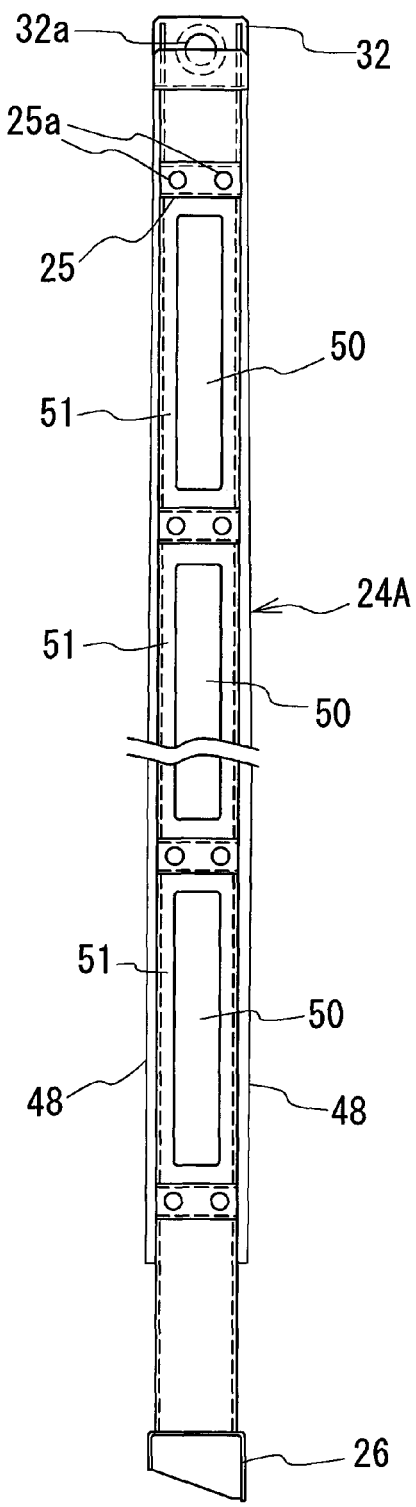
FIG. 10 is a front view of another example of the support frame according to the present invention.

FIG. 10 is a front view presenting another example of a support frame 24 that splits the opening area 18 into separate openings. The support frame 24A in this example includes air passages 50 formed therein formed so as to pass through the support frame 24A along the forward/backward direction. By forming such air passages 50, the extent to which the presence of the support frame 24A reduces the air passage area can be minimized.

Moreover, the support frame 24A in this example includes sound absorbing material 51 disposed at the inner walls over the areas where the air passages 50 are formed. The presence of such sound absorbing material 51 is bound to improve the noise dampening effect achieved at the support frame 24A.

As long as the features characterizing the present invention are not compromised, the present invention is not limited to the particulars of the embodiments described above and other modes that are conceivable within the technical scope of the present invention are also within the scope of invention. For instance, the support frame may range along the lateral direction instead of the longitudinal direction. As a further alternative, a support frame may be disposed to range along both the longitudinal direction and the lateral direction, instead of just the longitudinal direction. In addition, the opening may be split into three or more opening areas.

The invention claimed is:

1. A haulage vehicle, comprising:

a support frame that divides an opening area, through which air is taken into a radiator for an engine installed in a chassis of said haulage vehicle, into smaller partitioned areas; and a plurality of sound absorbing ducts, each mounted at one of said partitioned areas of said opening area, which are defined by said support frame, by locking mounting pieces disposed in peripheral areas to a frame present around said opening area and to said support frame via bolts, and each having a plurality of air passages with a sound absorbing material bonded to inner walls of said air passages, wherein said support frame includes an air passage formed therein through which air travels to said radiator.

2. The haulage vehicle according to claim 1, wherein a lower end of said support frame is locked to a mainframe of said chassis, whereas an upper end of said support frame is locked to a foot access deck so as to divide said opening area into a left-side partitioned area and a right-side partitioned area.

3. The haulage vehicle according to claim 1, wherein a sound absorbing material is bonded to inner walls of said air passage of said support frame.

4. The haulage vehicle according to claim 2, wherein a sound absorbing material is bonded to inner walls of said air passage of said support frame.

* * * * *